United States Patent
Rubin et al.

[15] 3,661,605
[45] May 9, 1972

[54] RELEASE PRODUCT

[72] Inventors: Leon R. Rubin; Arthur E. Meyerhoff, Jr., both of Chicago, Ill.

[73] Assignee: American Home Products Corporation

[22] Filed: June 8, 1970

[21] Appl. No.: 44,619

[52] U.S. Cl. ............................................106/244, 117/167
[51] Int. Cl. .........................................................C08h 9/00
[58] Field of Search ...............................117/167, 6; 106/244

[56] References Cited

UNITED STATES PATENTS

| | | | |
|---|---|---|---|
| 3,366,494 | 1/1968 | Bower | 99/189 |
| 2,796,363 | 6/1957 | Lalone | 117/167 |
| 3,038,816 | 6/1962 | Drell | 106/287 |
| 3,490,923 | 1/1970 | Eiseman | 99/189 |

*Primary Examiner*—Theodore Morris
*Attorney*—Victor Vito Bellino, Andrew Kafko and Egon E. Berg

[57] ABSTRACT

An aqueous aerosol composition is composed of a homogenized dispersion of lecithin in water and contains a propellant, e.g., carbon dioxide or nitrous oxide, for pressurizing the composition in an amount sufficient to produce a release coating of lecithin on a surface when the composition is sprayed. Other ingredients such as preservatives, i.e., bacteriostats and/or fungistats, and supplemental emulsifiers can be included where desired or needed.

3 Claims, No Drawings

RELEASE PRODUCT

BACKGROUND OF THE INVENTION

1. Field of the Invention

This invention relates to release agent compositions of the type containing lecithin which are useful for coating surfaces to provide a release surface.

2. Description of the Prior Art

Lecithin, when applied to the surface of a mold, cooking utensil, ski, zipper, or other implement, provides an excellent release coating. It has previously been suggested to prepare lecithin compositions in the form of aerosol sprays which have been especially useful in spraying cooking surfaces to provide for low calorie fat free cooking, while still permitting release of food from the cooking surface after the food is cooked. Such aerosol spray compositions have been disclosed in U.S. Pat. No. 2,796,363 to Lalone, issued June 18, 1957. With the Lalone compositions it was generally thought necessary to dissolve the lecithin in an organic solvent before combining it with the propellant system. This is because pure lecithin is highly viscous and extremely difficult to work with. However, many solvents are undesirable in that they leave a residue when the product is sprayed on a surface or have an unwanted odor, at least when the surface is to be used with foods.

In another aerosol spray composition containing lecithin, i.e., that of Drell et al., disclosed in U.S. Pat. No. 3,038,816, issued June 12, 1962, the lecithin is first dissolved in monofluortrichlormethane as a solvent and then combined with a propellant to provide the aerosol spray. This solvent eliminates the residue problem and the compositions are quite useful. However when they are applied to impinge on a flame, e.g., in a cooking area, there is a chance that the fluorocarbon solvent will break down into undesirable by-products.

SUMMARY OF THE INVENTION

The present invention provides a new aerosol spray release product of the type containing lecithin. The present compositions can be formulated to exclude any unwanted organic solvents and/or fluorocarbon propellants. In the compositions water is used as the carrier and the lecithin is present in the form of a dispersion in the water. Usually the dispersion is a homogenized dispersion. The dispersion can be placed in a suitable container and pressurized with a suitable propellant. In the especially preferred compositions where fluorocarbon propellants are omitted, such propellants as carbon dioxide and nitrous oxide can be used. Organic solvents are not needed and can be omitted from the formulation, thereby eliminating any unwanted residue or odors from such solvents.

While embodiments of the present invention will be described in detail herein, the invention is susceptible of embodiment in many different forms and it should be understood that the present disclosure is to be considered as an exemplification of the principles of the invention and is not intended to limit the invention to the specifically disclosed embodiments.

DESCRIPTION OF THE PREFERRED EMBODIMENTS

In its preferred form, the present invention provides a coating composition which is an aqueous dispersion of lecithin, e.g., hydroxylated lecithin, containing a minor amount less than half and usually more than 3 percent and usually less than about 30 percent lecithin. Normally, the lecithin content will be 1 to 20 percent and preferably 12 to 20 percent based on water and the composition is homogenized to decrease chances of separation of the lecithin from the water. The composition is conveniently adapted for use in aerosol spray containers and in such use it is pressurized by a propellant, preferably a food grade propellant. Sufficient propellant is used to pressurize the composition to a normal aerosol composition pressure, e.g., 50 to 150 psig and more usually 80 to 100 psig. Because the combination of lecithin and water tend to support growth of bacteria and/or fungi, it is preferred that a preservative such as sodium benzoate, calcium propionate, sorbic acid or salts or sorbic acid, such as sodium sorbate and potassium sorbate, be included in the composition. Recommended use levels for preservatives are 0.05 to 0.1 percent sodium benzoate, 0.03 to 0.1 percent sorbate or 0.1 to 0.3 percent calcium propionate, although more or less preservative can be used as needed.

The useful propellants are those normally used in aerosol products. Especially preferred are the propellants which escape readily on use. Accordingly, carbon dioxide and nitrous oxide are especially preferred although in preferred compositions these propellants can be supplemented with other propellants. Where the composition is to be used for coating a cooking surface supplemental food type propellants may be used. Other advantageous propellants are the lower alkanes and alkenes such as the $C_2$ to $C_4$ or $C_5$ open chain hydrocarbons, e.g., propane, butane or isobutane. Because the lecithin is used in a water dispersion, any flammable propellants such as the above mentioned hydrocarbons are quenched by the water during use and do not appear to create any fire or explosion hazards. The Freons or other fluorocarbons such as Freon 11 (trichlorofluoromethane), Freon 12 (dichlorodifluoromethane), Freon 115 (chloropentafluoroethane) or mixtures thereof, can also be used alone or as supplement propellants in the present compositions although they are not the preferred propellants.

Lecithin is a good emulsifier in addition to providing nonsticking properties on cooking surfaces. The emulsifier properties of the lecithin assist in homogenization of the dispersion. Also, where additive ingredients are used which require emulsification in the aqueous system, the lecithin will often accommodate them. For example, small amounts of vegetable oil are often included as a lubricant in lecithin to improve its handling and such oils are emulsified in the water of the present composition by the lecithin. Where greater emulsification is desired, other food grade emulsifiers can be used to supplement the lecithin.

The coating composition can be uniformly and effectively applied to surfaces of molds, frying pans, sauce pans, baking tins, or other surfaces whether made of metal, glass, or ceramic materials. Preferably, the coating composition is applied by spraying from an aerosol bomb and a very thin film of the coating composition is thereby provided on the cooking surface. Such a thin film will permit the cooking of moisture-containing materials such as eggs, pancakes, etc., without grease or fat, and after cooking, these materials will come free from the surface without rubbing or scouring. When fatty foods are cooked on a surface so coated, they will come off readily by soaking in water for a few minutes, even when burned crisp or charred. In no case is scrubbing, scouring or the use of brushes, abrasives or scouring powders, soaps or detergents normally required for cleaning. While preferably the composition should be applied each time the surface is used for cooking, in many cases the coating will last for two or three cookings without reapplication.

Although aerosol bomb application is preferred, the aqueous dispersion of lecithin can also be sprayed by other means such as squeezing from a flexible bottle, e.g., a polyethylene bottle. It is also possible to apply the dispersion merely using absorbent pads or daubers or paper impregnated with the composition. Although produced on a cooking surface using the preferred compositions after the water has completely vaporized, it is contemplated that various diluent materials may be added to the composition which do not vaporize and which become part of the coating. However, where such diluents are used, it is preferred that the coating composition be compounded to contain at least 10 percent by weight lecithin based on total nonvolatiles, to assure effective release of cooked foods. Useful diluents include, but are not limited to, edible detergents such as glyceryl monostearate and other fatty esters such as glyceryl monolaurate, glyceryl monooleate and glyceryl oleostearate as well as the glycol fatty acid esters such as diethylene glycol monostearate, propylene glycol monostearate and the polyethylene glycol fatty acid esters such as polyethylene glycol monostearate. Emulsifiable vegetable oils and the like can also be used as diluents in the composition, although the presence of large amounts of such oils is not preferred.

By way of further illustration of the present invention, the following examples are given.

EXAMPLE 1

Centrolene S (hydroxylated lecithin obtained from Central Soya Company, Inc., Chicago, Illinois) is added to water in amount of 12 percent by weight based on water and the resulting mixture is agitated until the Centrolene S is thoroughly dispersed and then homogenized in a homogenizer. The resulting dispersion is added to an aerosol container and pressurized to 90 psig with carbon dioxide. In use, the composition is dispersed in normal manner from the aerosol container against a cooking surface and, on vaporization of the water, a good non-stick lecithin coating is provided.

It has been found in the water base compositions that the water leaves the surface readily by vaporization or rebound and, if the cooking surface is to be used immediately, whatever water remains is vaporized when the surface is heated for cooking purposes.

EXAMPLE 2

Example 1 is repeated using 20 percent Centrolene S in water with similar results.

EXAMPLE 3

Example 1 is repeated using 15 percent Centrolene S in water and substituting nitrous oxide for carbon dioxide with similar results.

EXAMPLE 4

An aqueous dispersion of lecithin in water is prepared by mixing and homogenizing 12 percent by weight lecithin with water until the lecithin is thoroughly dispersed.

EXAMPLE 5

One-tenth of one percent of sodium benzoate is added to an aliquot of the composition of Example 4.

EXAMPLE 6

One-tenth of one percent of sodium sorbate is added to an aliquot of composition of Example 4.

EXAMPLE 7

Two-tenths of one percent of calcium propionate is added to an aliquot of the composition of Example 4.

Each of the compositions of Examples 5 through 7 is pressurized with $CO_2$ to about 90 psig and the pressurized composition is shelf stable over an extended period of time without supporting growth of fungi or bacteria.

EXAMPLE 8

Compositions prepared in accordance with Examples 4 through 7 can be pressurized, e.g., to about 90 psig with nitrous oxide, propane, butane, isobutane, Freon 115, Freon 11 and mixtures thereof, in separate aerosol containers. The compositions, when sprayed from the containers against the cooking surface, produce a non-stick coating of lecithin on the cooking surface.

EXAMPLE 9

Twelve percent by weight Centrolene S is added and thoroughly dispersed in water and then homogenized. Eight ounces of the homogenized dispersion are placed in a 13 oz. aerosol bomb and 2 grams of Freon 115 are added under pressure. The material is then pressurized to 90 psig with $CO_2$. The composition, when sprayed from the container, does not have an objectionable Freon odor and the Freon, being a very low boiling Freon, escapes readily and is difficult to contain in a paper bag or the like.

EXAMPLE 10

Fifteen percent by weight Centrolene S and 2.5 percent by weight of polyglycerine oleate were added to water. The composition was mixed in a homogenizer until the Centrolene S was thoroughly dispersed and homogenized.

EXAMPLE 11

The homogenized dispersion of Example 10 was pressurized in an aerosol container using 15 parts by weight isobutane for each 85 parts by weight of the dispersion. The composition was then dispensed from the aerosol container and the spray was found to be nonflammable. When sprayed on a cooking surface, a non-stick film of hydroxylated lecithin formed on the surface.

EXAMPLE 12

The homogenized dispersion of Example 10 is absorbed in a sponge and applied to a cooking surface of a frying pan to provide a non-stick cooking surface.

As is evident from the foregoing disclosure, the present invention provides new and useful release products which contain lecithin and use water as the carrier for the lecithin. Organic solvents and any odor problems they may create can be eliminated. Further, fluorocarbons need not be used as the propellant so that the compositions can be used at higher temperatures without producing unwanted products of fluorocarbon decomposition. The expense of the release product can be markedly reduced because the system is basically aqueous, does not require the more expensive organic solvents or oils and permits selection of the propellant from a wide variety of less expensive propellants, such as carbon dioxide.

We claim:

1. A surface release product in the form of an aerosol composition consisting essentially of (a) a dispersion of a hydroxylated lecithin in water, said dispersion being homogenized and said lecithin being present in said dispersion in an amount from about 3 to about 30 percent by weight of said water and (b) an aerosol propellant selected from the class consisting of carbon dioxide, nitrous oxide, lower alkane having two through five carbon atoms and mixtures thereof in an amount sufficient to pressurize said composition when dispensed from an aerosol container onto an implement surface to form a thin coating on said surface, said coating containing at least about 10 percent by weight of said hydroxylated lecithin.

2. An aerosol composition according to claim 1 wherein said lecithin is present in said dispersion in an amount between about 12 and about 20 percent by weight of said water.

3. An aerosol composition according to claim 1 which additionally includes at least one material selected from the class consisting of preservatives in an amount in the range of about 0.01 to 1.0 percent by weight of said aqueous dispersion, a vegetable oil and a fatty acid ester.

* * * * *